(12) United States Patent
Sweeney (10) Patent No.: US 8,746,042 B2
(45) Date of Patent: Jun. 10, 2014

(54) METHODS AND APPARATUS FOR SUBSEA PIPELINE INTEGRITY TESTING

(71) Applicant: Alan Sweeney, Houston, TX (US)

(72) Inventor: Alan Sweeney, Houston, TX (US)

(73) Assignee: Valkyrie Commissioning Services Inc., Houston, TX (US)

( * ) Notice: Subject to any disclaimer, the term of this patent is extended or adjusted under 35 U.S.C. 154(b) by 0 days.

(21) Appl. No.: 13/773,096

(22) Filed: Feb. 21, 2013

(65) Prior Publication Data

US 2013/0160525 A1 Jun. 27, 2013

Related U.S. Application Data

(62) Division of application No. 12/526,885, filed as application No. PCT/US2008/053733 on Feb. 12, 2008, now Pat. No. 8,381,578.

(60) Provisional application No. 60/889,478, filed on Feb. 12, 2007.

(51) Int. Cl.
*G01M 3/02* (2006.01)

(52) U.S. Cl.
USPC .......................................... 73/49.1

(58) Field of Classification Search
USPC ........... 73/40, 40.5 R, 49.1; 405/154.1, 184.1
See application file for complete search history.

(56) References Cited

U.S. PATENT DOCUMENTS

| | | | |
|---|---|---|---|
| 3,777,499 A | 12/1973 | Matthews | |
| 3,961,493 A | 6/1976 | Nolan, Jr. et al. | |
| 4,155,669 A | 5/1979 | Rochelle | |
| 5,044,827 A | 9/1991 | Gray et al. | |
| 5,883,303 A | 3/1999 | Bliss et al. | |
| 5,927,901 A | 7/1999 | Graves | |
| 6,062,313 A | 5/2000 | Moore | |
| 6,435,279 B1 | 8/2002 | Howe et al. | |
| 6,454,492 B1 | 9/2002 | Dean et al. | |
| 6,840,088 B2 | 1/2005 | Tucker et al. | |
| 7,185,705 B2 | 3/2007 | Fontana | |
| 7,281,880 B2 | 10/2007 | Tucker et al. | |
| 7,481,270 B2 | 1/2009 | Shepler | |
| 2003/0154769 A1* | 8/2003 | Tucker et al. ............... 73/49.1 |
| 2004/0031623 A1* | 2/2004 | Fontana ........................ 175/7 |
| 2011/0200457 A1* | 8/2011 | Biester ......................... 417/53 |

FOREIGN PATENT DOCUMENTS

GB WO02/088658 A2 11/2002

OTHER PUBLICATIONS

International Search Report and Written Opinion mail date Sep. 16, 2008, received in corresponding PCT patent application No. PCT/US08/53733.

* cited by examiner

*Primary Examiner* — Daniel S Larkin
(74) *Attorney, Agent, or Firm* — Wong, Cabello, Lutsch, Rutherford & Brucculeri, LLP (57) ABSTRACT

Apparatus and methods are described for subsea pipeline servicing, including line-pack testing, physical integrity testing, recovery of damaged sections of pipelines, and product removal from subsea structures. In one embodiment of the invention, a subsea pipeline service skid is provided including at least one sample collection bladder affixed to the skid and in fluid communication with a skid mounted pump dimensioned to pull a sample from the subsea pipeline. In another embodiment, a product removal bladder is provided for removal of the hydrocarbons from a subsea structure.

9 Claims, 11 Drawing Sheets

METHODS AND APPARATUS FOR SUBSEA PIPELINE INTEGRITY TESTING

CROSS REFERENCE TO RELATED APPLICATIONS

This Application is a divisional of and claims priority to U.S. patent application Ser. No. 12/526,885, filed Aug. 12, 2009, now U.S. Pat. No. 8,381,578, which in turn claims priority to Patent Cooperation Treaty Application PCT/US08/53733, filed on Feb. 12, 2008, and U.S. Provisional Application 60/889,478, filed Feb. 12, 2007, priority to each of which is claimed herein and which are each incorporated by reference herein in their entireties.

FIELD OF THE INVENTION

This invention relates apparatus and methods for service of subsea pipelines, including chemical sampling and treatment thereof, as well as wet buckle remediation and pipeline integrity testing.

BACKGROUND OF THE INVENTION

Without limiting the scope of the invention, its background is described in connection with novel apparatus and methods for service of subsea pipelines.

It is currently estimated that approximately 60% of the world's petroleum production derives from offshore operations. To meet demands, and in an environment of increased values for oil and gas, exploration and subsequent production is being undertaken in deeper and deeper waters. For example, oil and gas is now being produced off the Louisiana coast in 9,000 feet of water. These offshore efforts have required expensive specialized solutions including establishment of extensive networks of subsea pipelines for transport of oil and gas from well heads to gathering structures, hub facilities and to onshore processing refineries.

The cost of laying pipelines subsea is immense and, therefore, the pipelines are carefully managed and serviced to extend their workable lives. Pipelines running from large fields are engineered to have a design life of thirty to fifty years. Occasionally pipelines or "flow lines" are damaged during laying of the pipe, or as a consequence of subsequent physical damage or environmental conditions. Excessive bending of pipe results in structural damage including buckling. Where damage results in a crack in the pipe and fluid inflow this is termed a "wet buckle." Whether occurring during laying or thereafter, sections of buckled pipeline must be removed from the pipeline and repaired.

In one method of recovering wet buckled pipe disclosed in U.S. Pat. No. 5,044,827 (Gray et al.), a submersible vessel ("SV") is used to inflate lift bags beneath the submerged pipeline followed by cutting out the damaged section of pipe. Finally, the SV inserts a recovery head into an end of the cut pipe to grip the pipe for winching to the surface. In order to lift the damaged sections to the surface, wet buckled pipe must be evacuated of fluid or "dewatered" to reduce its weight. As described by Gray, pipeline sections typically are dewatered using topside pumps to provide compressed gas to drive a dewatering pig from the surface through the pipeline, stopping at the subsea recovery head. Alternatively, as described in U.S. Pat. No. 3,777,499 (Matthews), one subsea end of the pipeline can be sealed with a cap that includes a gas inlet and gas supplied from the surface can be introduced from one end while liquids are pumped from the other end using a pump lowered and powered from the surface and disposed at the other end of the pipeline.

Compressed gas for driving a dewatering pig must be provided at sufficient pressure to drive the pig considering several dynamic components including: the hydrostatic pressure of the water over the pipe, the friction pressure of the fluid as it moves through the pipe, and the friction of the pig against the pipeline walls (pig differential). Because hydrostatic pressure is by far the most significant dynamic component as water depth increases, topside dewatering has required very large top-side air compression spreads that must remain in position over the damaged pipelines during recovery efforts. What are needed are subsea apparatus and methods able to provide recovery of damaged pipeline that avoid the need for large topside gas compressor spreads and/or topside powered dewatering pumps.

Another required pipeline service relates to chemical sampling and treatment. Sections of pipeline that are waiting to be put into service, or that have been damaged and are awaiting remediation, are typically chemically treated to prevent corrosion. In addition, in-service pipelines may become clogged with contaminants that reduce flow, particularly where the pipelines carry a number of different products in multiphase flow. These include hydrates, asphaltenes, scale, and paraffins. For each of these contaminants and build-ups, specific remediative chemical treatments have been developed and are often combined with pigging to physically clean the pipeline and to load the pipeline with the remediative chemicals. Pigging is typically implemented via surface power wherein power fluid or gas is conveyed to a subsea pipeline manifold via coiled tubing run from the surface. Likewise, chemical injection pumps are typically located topside. Testing for the efficacy of the remediative chemical treatment has traditionally been done by modeling of supposed subsea conditions, including factors of temperature, pressure and the type of product carried in the pipeline. Actual subsea sampling of pipeline sections has not heretofore been possible.

In some cases, service is required on a portion of a subsea product or flow line system that has been in service and contains hydrocarbon products. Removal of the product to the surface without environmental release of the hydrocarbon product has heretofore required connection to the surface via coiled tubing or drill string or has required complete decommissioning and recommissioning. Subsea removal of product has not been heretofore possible and represents an unmet need in the industry.

Another heretofore underserved pipeline service relates to leak detection, where the presence of a wet buckle must be detected, or more generally where the continued ability of a pipeline both to contain its contents, and to protect the contents from in-flow may need to be assessed. In the past, testing for leaks has generally required putting in place a means to monitor changes in pressure, or alternatively the facility to detect noise made by leakage.

What are needed are subsea pipeline service apparatus and methods able to detect leaks in pipelines, to dewater pipelines such that damaged pipelines can be lifted for repair, as well as apparatus and methods able to provide sampling of the in situ chemical mileu of chemically treated pipelines, remove product from flowline system elements, and, if desired, to treat sections of pipeline, all using a completely subsea service skid.

BRIEF SUMMARY OF THE INVENTION

The present invention is directed to a methods and apparatus for subsea pipeline servicing, including line-pack testing, physical integrity testing, removal of hydrocarbon product, and recovery of damaged sections of pipelines.

In one embodiment of the invention, a sample collection bladder is provided for collecting samples of pipeline lie-pack solution subsea. In further embodiments, the chemical sampling bladder is in fluid communication with a filtration system, wherein any chemicals disposed within the pipeline that are not collected in the bladder are flushed though the filtration system and thereby purified prior to any ambient discharge. In some embodiments, the sample collection bladder is fitted with a hydraulic compensator to control discharge of fluid during return to the surface. In one embodiment of the invention the chemical sampling bladder together with any associated filtration systems and other mechanisms is affixed to a subsea pipeline service skid and is in fluid communication with a skid mounted pump dimensioned to pull a sample from the subsea pipeline. In one embodiment of the invention the chemical sampling bladder is located within the skid frame. Alternatively, the bladder may be mounted or strapped on the outside of the skid frame. Preferably the pump is operated by a hydraulic motor powered by an SV, ROV or AUV that transports the skid to the subsea location.

In some embodiments, the skid further includes at least one chemical treatment bladder for redosing the pipeline with chemicals after removal of the sample. The skid may further include a chemical dosing pump.

In one embodiment of the invention, methods and apparatus are provided for subsea removal of product from a pipeline containing hydrocarbon product. The apparatus includes at least one product removal bladder dimensioned to contain product removed from subsea jumpers or risers. In one embodiment of a method for product removal, hydrocarbon is pulled or pushed out by pump action or allowed to float up out of a jumper or riser by influx of lower density seawater under the hydrocarbon product.

In certain embodiments, the skid includes a pump that is dimensioned to reduce pressure in the pipeline by approximately 200 p.s.i. in order to take a sample. In certain embodiments where sampling is to take place under conditions of extreme pressure, the pump is a high pressure pump dimensioned to reduce pressure by 200 p.s.i. under hydrostatic pressures from 400 to 4000 p.s.i. In other shallow water embodiments, the pump is not required to be a high pressure pump.

In one embodiment of the invention a subsea pipeline service skid is provided that includes at least one skid mounted high pressure pump dimensioned to deliver from about 4,000 to about 20,000 p.s.i. of pressure and at least one hand pump operable by the SV, ROV or AUV to equalize the pressure between the high pressure pump and a flowline/pipeline prior to initiating fluid communication between the high pressure pump and the pipeline.

In one embodiment of the invention, a method of remediation of a wet buckled pipeline using a subsea pipeline service skid is provided including the steps of retaining one open end of the buckled pipeline above water and exposed to a source of air; cutting the buckled pipeline below a damaged section; attaching a valve able closure to the cut end; connecting a pump to the valve able closure and running the pump to reduce pressure in the pipeline and thereby draw air in from the atmosphere to displace the water in the severed section.

In another embodiment of the invention, a method of recovering a section of pipeline disposed on a seabed is provided including the steps of deploying an SV, AUV or ROV to install termination heads on each of first and second ends of the pipeline section; providing a source of compressed gas to the first end of the pipeline section; utilizing the SV, AUV or ROV to move an SPSS that includes a high pressure pump to the second end of the pipeline section and connect the SPSS to the termination head; and using the SV, AUV or ROV, power the high pressure pump to pull water out of the pipeline and displace fluid in the pipeline with a relatively modest volume of gas from the compressed gas source, thereby dewatering the pipeline; and recovering the dewatered section of pipeline from the seabed. Optionally, the method further includes inserting a dewatering pig in the first end of the pipeline section whereby the pig is advanced toward the second end of the pipeline section by a combined sucking action of the pump and pushing action of the compressed gas.

In another embodiment, a method of subsea pipeline integrity testing is provided including the steps of providing an SPSS that comprises at least one high pressure pump and a pressure monitor able to detect a change in pressure of about 1 p.s.i. or less; utilizing an SV, AUV or ROV to move the SPSS to a subsea section of pipeline, wherein a pipeline termination head is affixed to each end of the pipeline section; using the SV, AUV or ROV to power the high pressure pump to pull water out of the pipeline and thereby reduce pressure in the pipeline below ambient pressure around the pipeline; and monitoring pressure in the pipeline to determine if any in-flow leakage occurs sufficient to change pressure in the pipeline. In one such embodiment, the high pressure pump is dimensioned to reduce pressure in the pipeline at a hydrostatic pressure of about 400 p.s.i. In another embodiment, the high pressure pump is dimensioned to reduce pressure in the pipeline at a hydrostatic pressure of up to about 4000 p.s.i.

In another embodiment of the invention, methods and apparatus are provided for removing a fluid content of a subsea structure, such as for example a flowline jumper, flowline terminus or manifold, or a Christmas tree, including the steps of: providing at least one product removal bladder to the subsea structure, wherein the bladder is fitted with at least one valve closure and wherein the bladder is dimensioned to drain a quantity of the fluid content from the subsea structure; providing an SPSS including at least one pump and a fluid conduit that terminates in an SPSS fluid connector dimensioned to connect with the valve closure of the product removal bladder; utilizing an SV, AUV or ROV to connect the bladder and SPSS to the subsea structure; utilizing the SPSS pump to move fluid content from the subsea structure into the product removal bladder, and returning the product removal bladder to a surface vessel for disposal. In one method of removing a fluid content from a subsea structure, the SPSS includes intake filters and at least one pump on the SPSS is utilized to pump filtered seawater into the subsea structure and thereby push the fluid content of the subsea structure into product removal bladder.

Also provided herein are subsea fluid containment skids including at least one product removal bladder disposed in a cage and dimensioned to effect removal of a significant portion of a hydrocarbon or other fluid product from a subsea structure. By "effect removal of a significant portion" it is meant that the bladder is dimensioned to hold a sufficient quantity of product removed from the subsea structure such that the structure can be drained with operational efficiency. In one such example, the bladder is dimensioned to hold up to about 2000 gallons. Larger and smaller bladders are envisioned as well as deployment of a plurality of bladders that are filled in series for removal to the surface. In other embodiments, a containment skid is provided that includes a plurality of bladders for removal of fluid product from several subsea structures or different sections of a single subsea structure with few trips to the sea floor.

BRIEF DESCRIPTION OF THE DRAWINGS

For a more complete understanding of the present invention, including features and advantages, reference is now made to the detailed description of the invention along with the accompanying figures.

DETAILED DESCRIPTION OF THE INVENTION

While the making and using of various embodiments of the present invention are discussed in detail below, it should be appreciated that the present invention provides many applicable inventive concepts which can be employed in a wide variety of specific contexts. The specific embodiments discussed herein are merely illustrative of specific ways to make and use the invention and do not delimit the scope of the invention.

To facilitate the understanding of this invention, a number of terms and, in some cases, related abbreviations, are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

For purposes of the present invention, the term Pipeline End Termination ("PLET") defines a valved closure for a pipeline. However, the term PLET also refers to large subsea collection hubs including a plurality of pipeline terminations and valved closures. Such hubs can be dimensioned to connect a number of flowlines carrying oil and gas from various fields to production lines that may run, for example, to onshore facilitates.

As used herein, the abbreviation "SV" refers to a Submersible Vehicle that is operated by human operators in the SV. In contrast, as used herein, the abbreviation "ROV" refers to a tethered Remote Operated Vehicle that is operated from the surface remotely. The abbreviation "AUV" refers to untethered Autonomous Underwater Vehicles.

As used herein, the abbreviation "SPCS" refers to a subsea pipeline commissioning skid according to one embodiment of the invention. Pipeline commissioning is a multistep process that includes flooding of the subsea pipeline, running a pig through the pipeline to test for internal structural integrity, and hydrostatic pressure testing to insure both structural integrity and to test for leaks. Typically, hydrostatic pressure testing requires the pipeline to be placed at pressure for an interval sufficient to demonstrate its ability to withstand its intended operational pressure. Pressures and times for hydrotests will vary depending on the requirements of the end-user of the pipeline, and the regulatory regime that applies in the locale where the pipeline is being constructed. These will be as a minimum a test to the maximum operating pressure (MAOP) for at least four hours. More typically test pressure will be held for at least twenty-four hours, and will be some specified percentage of either MAOP or that pressure required to reach some percentage of specified minimum yield stress (SMYS) in the pipe material. The pressure required to perform the test depends directly on the depth of the water where the pipeline is located because the baseline pressure is the hydrostatic pressure at the given depth.

As used herein, the abbreviation "SPSS" refers to a subsea pipeline service skid according to one embodiment of the invention. The SPSS is not limited to pipeline commissioning but may be employed to service the pipeline subsequent to commissioning, including for example chemical sampling to determine the status of a pipeline that has been shut-in for a period of time, hydrostatic testing where damage to the pipeline is suspected or has been remediated, checking for inward leakage, dewatering of the pipeline for raising the pipeline from the seabed to the surface, product removal for pipeline system repair, as well as pigging to clean pipelines of in-service contaminants. The terms SPCS and SPSS are used interchangeably herein to refer to a subsea skid including at least one pump. In one embodiment of the invention, the SPCS or SPSS will include at least one high pressure pump of sufficient power to exceed hydrostatic pressure at depths of up to 10,000 feet of water.

The following examples are included for the sake of completeness of disclosure and to illustrate the methods of making the compositions and composites of the present invention as well as to present certain characteristics of the compositions. In no way are these examples intended to limit the scope or teaching of this disclosure.

EXAMPLE 1

Subsea Pipeline Service Skid

One embodiment of the present invention provides a Subsea Pipeline Service Skid ("SPSS") that includes at least one high pressure pump that is able to overcome the hydrostatic pressure of water up to and over 10,000 feet deep. Hydrostatic pressure P (in pascals, Pa) is equal to $\rho gh$, where $\rho$ (rho) is the water density in kilograms per cubic meter, g is gravitational acceleration in meters per second squared, and h is the height of fluid above in meters. Although water density changes with temperature, for purposes of ready calculation, a ρ value of 1027 kg/m³ (density of seawater at 5°) will be used. Ignoring changes in gravitation as one departs from the earth's surface, a constant value for g of 9.8 m/s² can be used. Using these constants for ρ and g, it can be calculated that the hydrostatic pressure of 1000 feet of water (304.8 meters) is 3.07×106 Pa (P=1027×9.8×304.8), which converts to 445 p.s.i. (1 p.s.i.=6894.76 Pa). For 1000 meters of water, the value is approximately 1460 p.s.i., while in 9000 feet of water (2743.2 meters), the hydrostatic pressure is approximately 4,004 p.s.i. In 10,000 feet of water the hydrostatic pressure is approximately 4,449 p.s.i. Thus, in the context of certain embodiments of the present invention, the term "high pressure pump" means a pump capable of continuing to deliver flow in situations where ambient pressure at both suction and discharge may be in excess of 400 p.s.i. In certain embodiments, the high pressure pump will be able to continue to deliver flow in situations where ambient pressure at both suction and discharge may be in excess of 4000 p.s.i.

Figure 9:
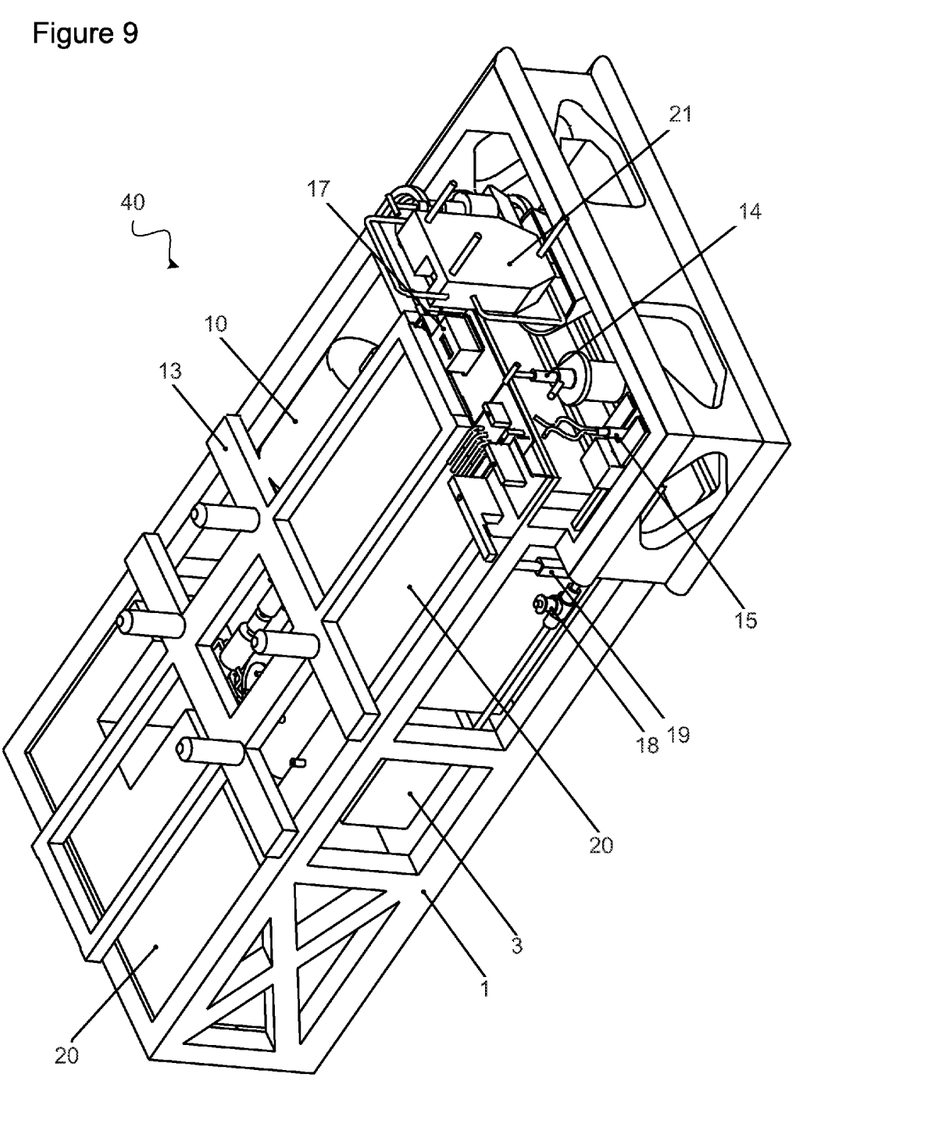
FIG. 9 depicts a one embodiment of a subsea pipeline commissioning skid (SPCS) to which a chemical sampling bladder can be attached.

In one embodiment of the invention, the SPSS provides a physical framework facilitating the full range of pre-commissioning and post-commissioning activities to be carried out on deepwater pipelines. To this end it is designed to carry several different pieces of equipment, depending on the details of the job in hand. One embodiment of a suitable SPSS is depicted in FIG. 9. Power is supplied hydraulically from an ROV or other source (AUV, SV). The minimum power required by the SPSS from this source will be approximately 70 HP. Taking into account other power requirements in running the ROV, the total hydraulic power requirement to provide 70 HP would be approximately 100 HP. More power may be required in certain applications. The SPSS is preferably provided with buoyancy, such as by one or more buoyancy compensator(s) (20), shown in FIGS. 9, 10, 11 and 12, in order that it can approximate neutral buoyancy at various depths. This facilitates maneuverability of the SPSS by the ROV, AUV or SV.

One embodiment of a suitable SPSS (40) is depicted in FIGS. 9-12. SPSS (40) includes a rigid frame (1) which is attachable to the SV, AUV or ROV via ROV mounting plate (13). The SPSS includes a high pressure pump, suitable for hydrotest and other operations. This pump must be capable of raising the pressure in the pipeline to the required test pressure, i.e. at least the specified maximum operating pressure, and generally some pressure higher than this. This pump will generally have to be capable of delivering sufficient flow to raise the pressure in the line at an acceptable rate, such as for example, a typical rate of 3-5 gpm, or 1 psig/minute. Pumps of positive displacement type are generally suitable for this service. In the embodiment depicted in FIGS. 10 and 12, a triplex type pump (2) connected via flexible coupling (25) to and operated by hydraulic motor (5) is employed. In one embodiment for lower depth applications, the pump is capable of providing a flow of 3-5 gpm at a hydrostatic pressure of approximately 400 p.s.i. with a minimum suction head of 30 p.s.i. In another embodiment dimensioned for deeper waters, the pump is capable of providing a flow of 3-5 gpm at a hydrostatic pressure of approximately 4000 p.s.i. with a minimum suction head of 30 p.s.i. In another embodiment, the pump is very high pressure pump able to deliver a flow of 3-5 gpm at a line pressure of 20,000 p.s.i. with a minimum suction head of 30 p.s.i.

Figure 11:
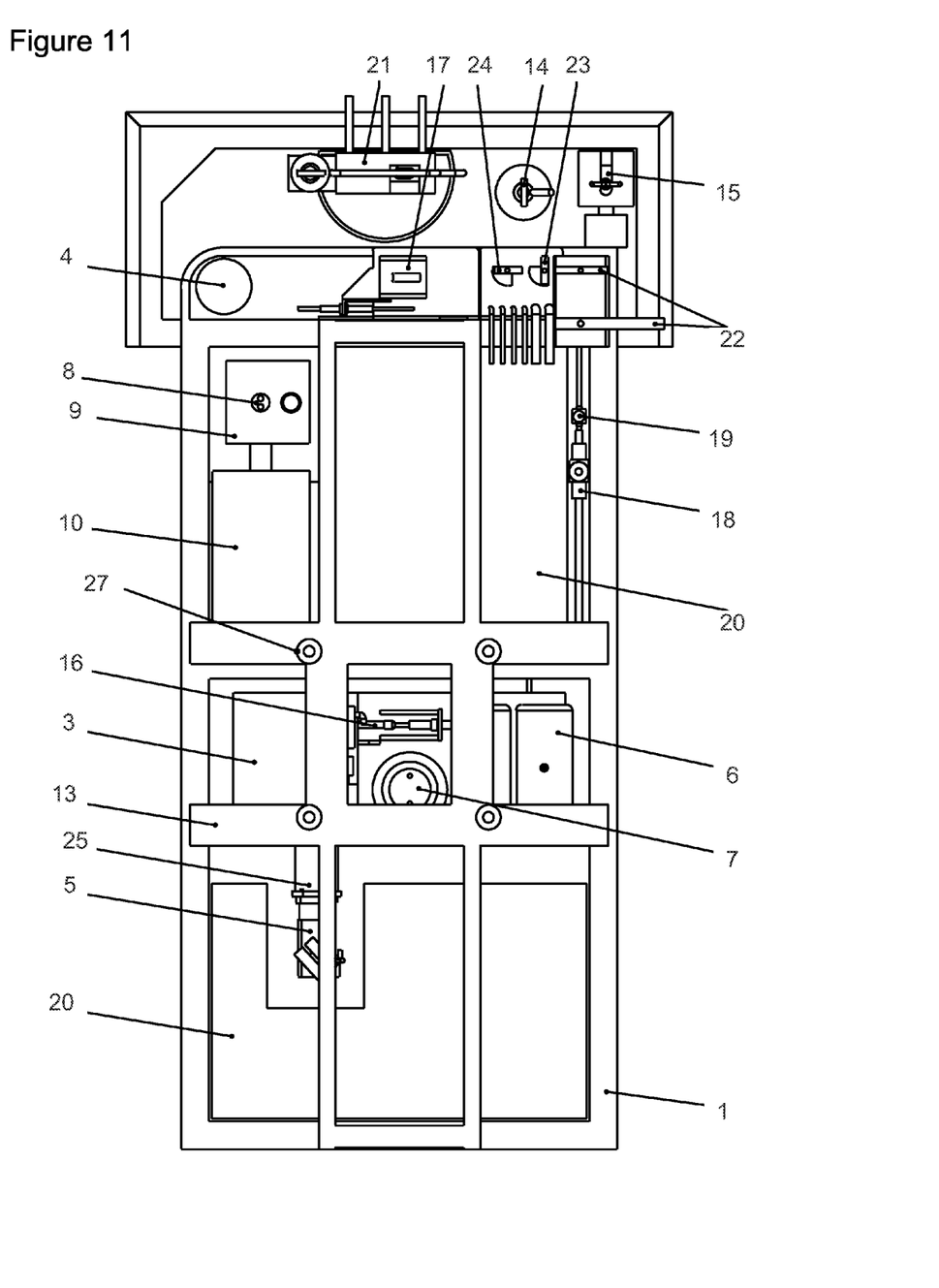
Figure 12:
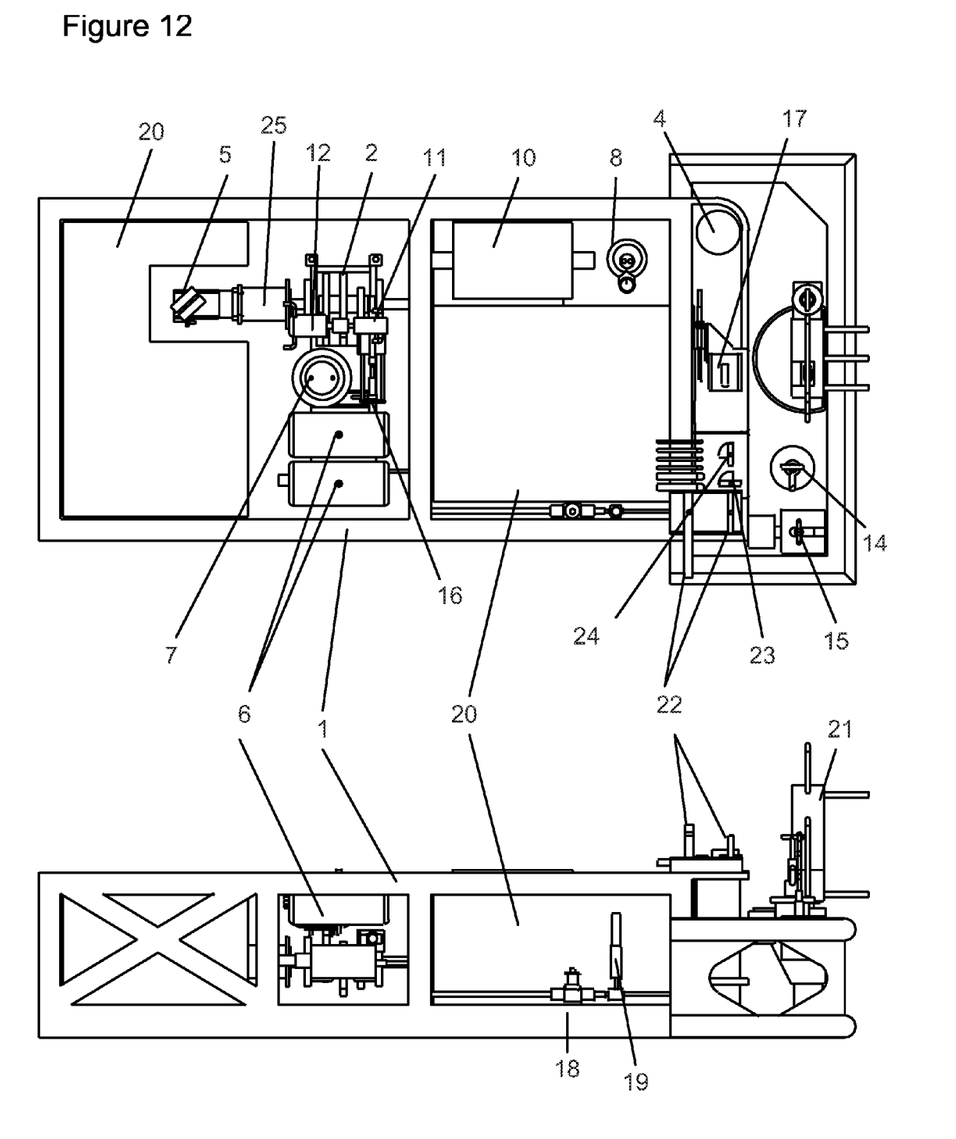

One or more filters (10) are required at the pump inlet able to filter out particles down to fifty microns or lower in size. The triplex pump (2) can be disposed in an optional pump cage (3) as depicted in FIG. 11. Likewise, FIG. 11 depicts an embodiment where a backflush pump (not shown) is protected in backflush pump housing (9). The top view provided by FIG. 11 shows a 1" male stab (14) as well as bleed valve (24), instrument isolation valve (23), and double block (22). Also depicted are the ROV attachment posts (27).

In one embodiment of the invention, the skid also includes a chemical or dosing pump (11) operated by hydraulic chemical pump motor (12), which is suitable for the injection of corrosion inhibitor and/or other chemicals that are transported on the skid by one or more chemical treatment bladders (6). Flow metering, such as is provided by flow meter (18) is present on the skid to provide a record of quantities of water pumped into the line/quantities of chemicals dosed. A pressure relief valve (19) is located in the flow line.

When outfitted for hydrotest purposes, the skid includes a data logger (21) and storage capability for pressure and temperature monitoring as is required during hydrotesting. The capability is typically provided by transducers for the measurement of the line pressure and temperature, with data being recorded into non-volatile memory. The SPSS may be provided with visual displays including stroke counter display (17), capable of being read by an ROV-mounted camera. The stroke counter display records the activity of stroke counter (16) depicted in the top view of FIG. 11. Alternatively, telemetery between the datalogger and the surface is provided. In one embodiment, a data communication link capable of connecting through the ROV to the surface providing a real-time read-out of values is also included. High accuracy/high stability measurements are needed for this application, as the data is critical to the assessment of pass/fail criteria for the hydrotest. In one embodiment of the invention, the SPSS logger has the ability to measure pressure to an accuracy of +/−0.02%, and temperature to an accuracy of +/−0.1° C.

Figure 10:
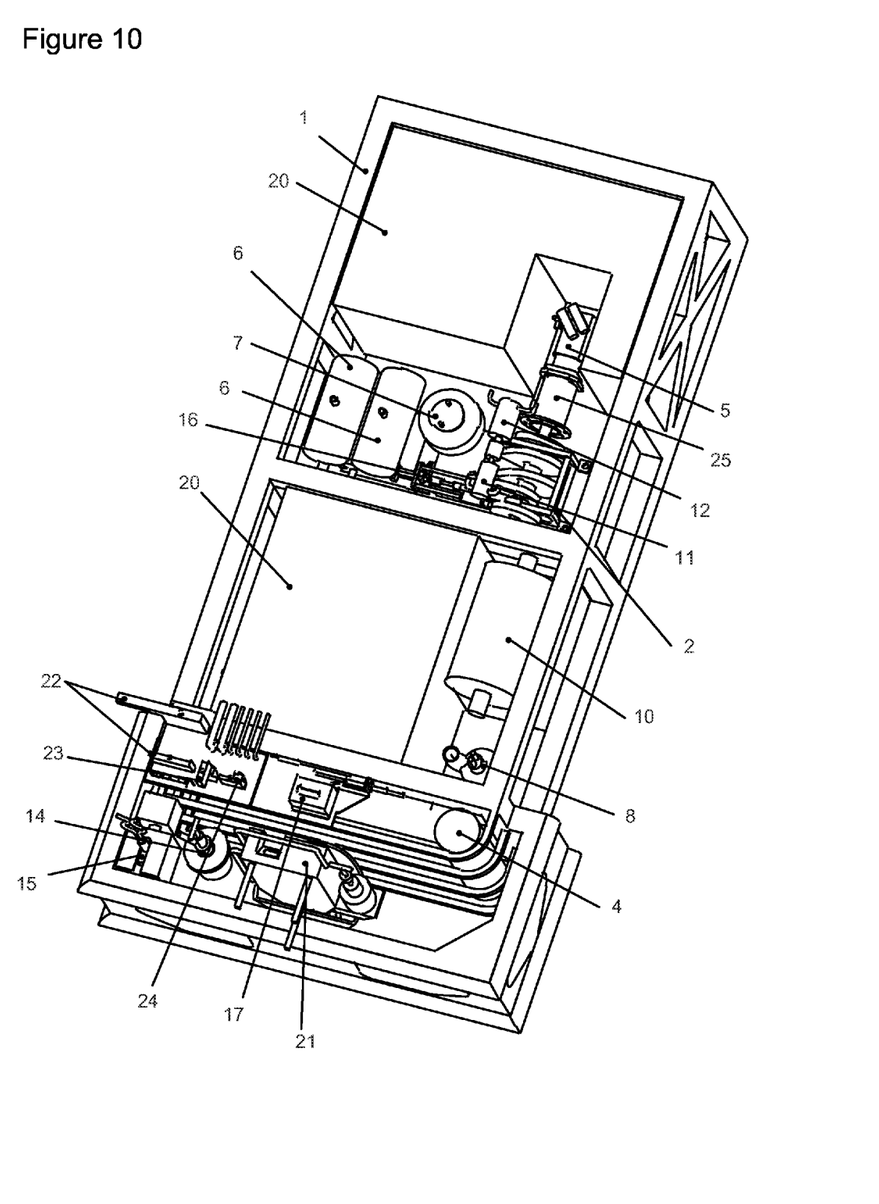
FIGS. 10, 11 and 12 provide further perspective views of the SPCS of FIG. 9.

A dewatering pump may also be present, capable of pushing a pig-train through the line. The high pressure pump that is dimensioned for hydrostatic testing may generally be suitable for this service. Additional pumps may be present on the skid to provide other services, such as for instance a backflush pump (8) together with backflush pump filter (4), depicted in FIGS. 10-12, to maintain the seawater filters in a state of continued efficacy, and a chemical injection or dosing pump described above. As depicted in FIGS. 10 and 11, an oil compensation unit (7) is optionally included and is preferably located in conjunction with the hydraulic pumps.

In one embodiment of the invention and as depicted in FIGS. 9-12, the skid includes a particular safety feature that is designed to preserve the integrity of connections between the pipeline and the high pressure pump. The discharge manifold and pressurization hose/hot stab of the SPSS are short in comparison to the entire length of the pipeline. Because regulation of hydraulic power to the triplex pump is difficult once it is engaged, direct unregulated connection of the triplex pump to the discharge manifold and pressurization hose/hot stab could pressurize the hose extremely quickly and possibly even burst the hose. Furthermore, the pressure transducers on these lines are extremely sensitive to shocks, particularly when employing quartz crystal resonators. Therefore, SPSS (40) includes a hand pump (15), depicted in FIGS. 9, 10, 11 and 12, to equalize the pressure between the skid mounted pump and the flowline/pipeline before the valve separating the two is opened.

For example, when the system is pressurized to test pressure and must remain so for a prolonged period, such as a twenty-four hour hydrotest period, and it is desirable to disconnect the ROV from the system in order to perform other work, the valve of the PLET cap is isolated, the pressurization hose/hot stab of the SPSS is depressurized and the SPSS is disconnected from the ROV and left in position on the pipeline. If the pressure drops for any reason or if it becomes desirable to pressurize once the test was complete, the hose would be reconnected to the PLET. The hand pump (15) would then be operated using the ROV manipulator to pressurize the hose in a slow and controlled manner and thereby equalize the pressure across the PLET valve. The valve would then be opened and the high pressure pump functionally engaged with the system.

EXAMPLE 2

Wet Buckle Remediation where the Pipeline Remains Attached to the Laying Barge

Figure 1:
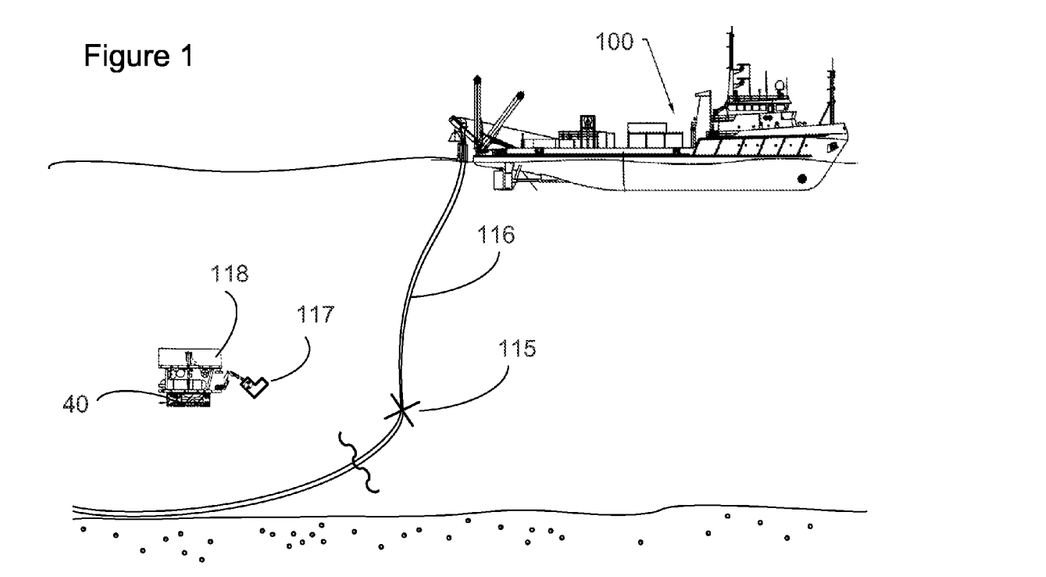
FIG. 1 illustrates removal of a section of wet buckled pipeline where the damaged pipe section remains attached to the laying vessel and thus has one end exposed to ambient air.

Occasionally when a pipeline is being laid, irregularities in the characteristics of the pipeline may suggest that the integrity of the pipeline may have been compromised such as by either a wet or dry buckle. Typically, a wet buckle will result in in-flow of water into the pipeline, which makes the pipeline begin to get heavier. In one solution to wet buckle remediation, the buckled pipe is still attached to the laying barge (100) as depicted in FIG. 1. An SV, AUV or ROV (118) is used to cut the pipeline (116) below the wet buckle (115). The SV, AUV or ROV then attaches a valvable closure (117), preferably including hot stab connections, to the bottom end of the pipeline. The SV, AUV or ROV is employed to carry a SPSS to the bottom end of the pipeline. The SPSS includes a high pressure pump able to deliver pressures across the range of 100-20,000 p.s.i. of pressure. The high pressure pump is connected to the valvable closure and the SV, AUV or ROV powers the pump to pull water out of the pipeline. Air, or alternatively nitrogen or other inert gas from the surface end of the pipe, displaces the water as it is pumped out of the pipe. The pipe is thus dewatered and un-weighted for recovery by the laying barge.

EXAMPLE 3

Figure 2:
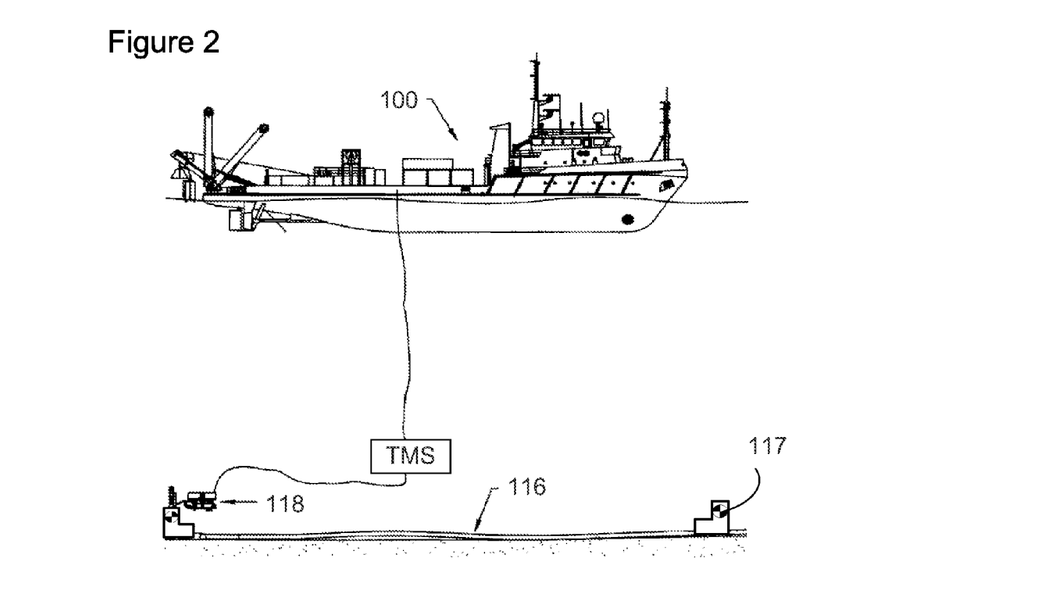
FIGS. 2, 3 and 4 depict use of an SV to transport a chemical sampling bladder to a pipeline section disposed between two PLETs, and its use to extract a sample of the pipeline contents for transportation to the surface. The same figures illustrate an embodiment of a process to check for the presence of leaks.
Figure 4:
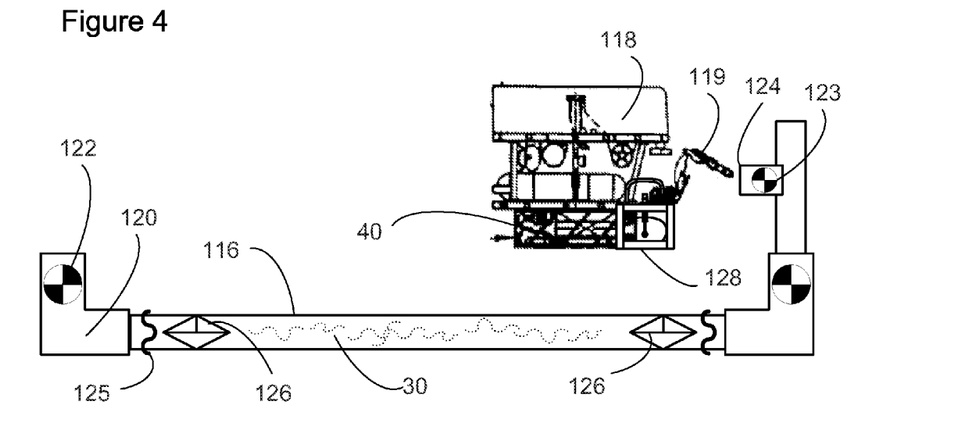
Figure 5:
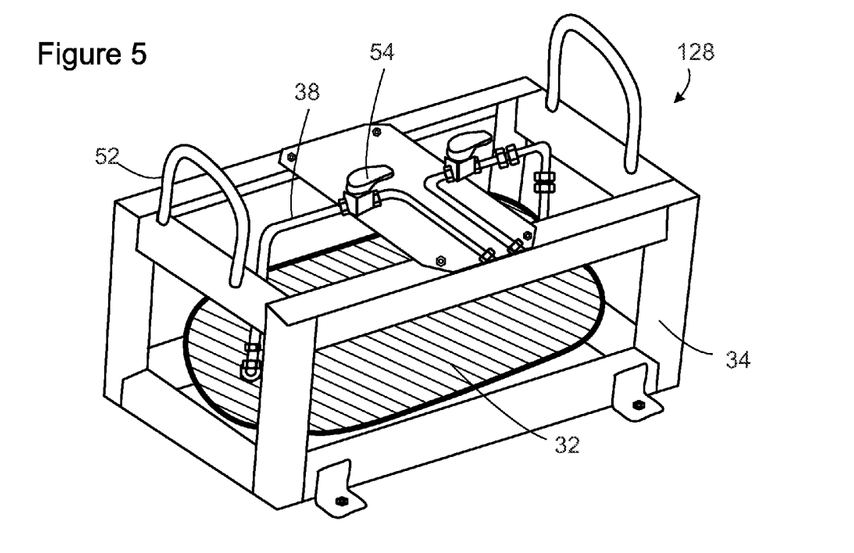
FIG. 5 depicts an oblique view of a chemical sampling bladder according to one embodiment of the invention.
Figure 6:
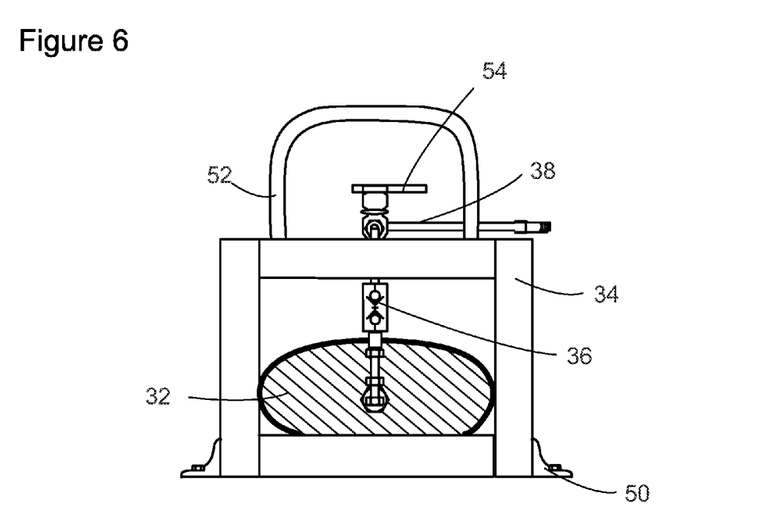
FIG. 6 depicts an end view of a chemical sampling bladder according to one embodiment of the invention.
Figure 7:
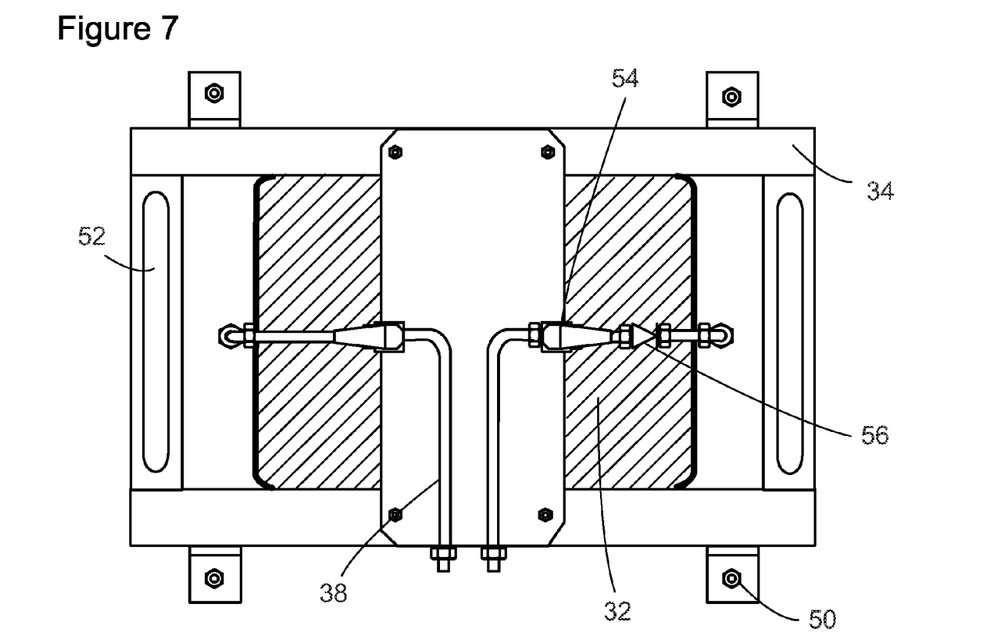
FIG. 7 depicts a top view of a chemical sampling bladder according to one embodiment of the invention.
Figure 8:
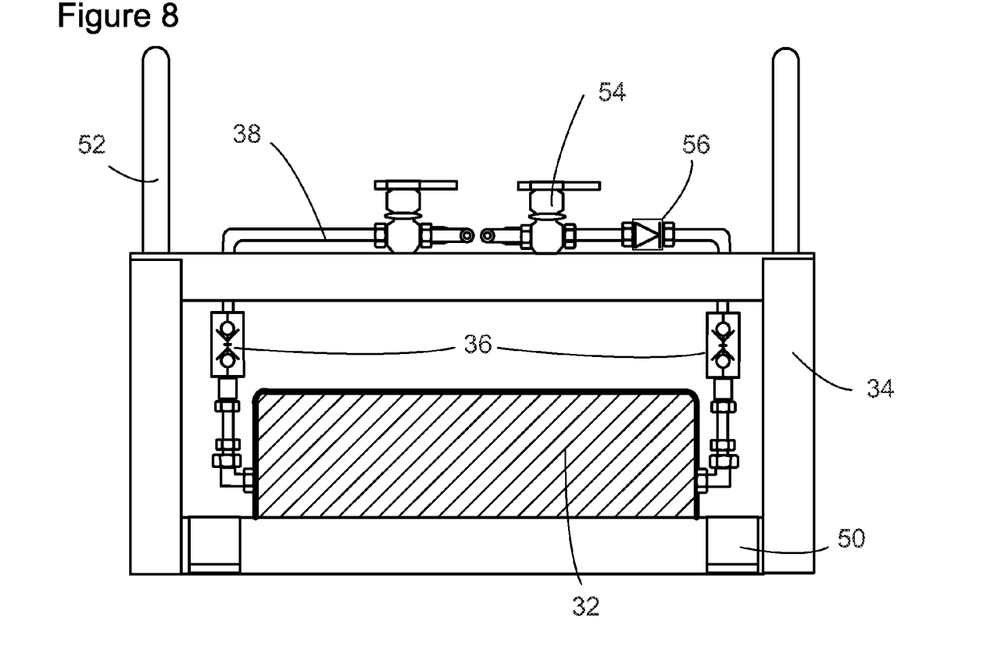
FIG. 8 depicts a side view of a chemical sampling bladder according to one embodiment of the invention.

Remediation of a Damaged Section of Pipeline Disposed on the Seabed

Where a wet buckle is suspected the pipeline may be dropped from the laying vessel and checked for damage and later remediation. However, the action of dropping the pipeline will result in filling of the pipeline. In order to raise the pipeline to the surface, the pipeline must be emptied. This is undertaken by using an SV, AUV or ROV (118) to install termination heads such as valvable closures (117), preferably including hot stab connections or abandonment, recovery or initiation laydown heads on each end of the pipeline as depicted in FIG. 2. A dewatering pig may be inserted in one end of the pipeline and a source of compressed air or nitrogen/other inert gas attached behind the pig. Alternatively in some circumstances the pig may not be required, and only the gas source used. In one embodiment the gas source is provided subsea to displace sufficient water to reduce weight and recover the pipe. The SV, SUV or ROV then moves an SPSS according to the invention to the opposite end of the pipeline and utilizes its robotic arm (119) to connect the high pressure pump of the SPSS to the hot stab connection (124) of the pipeline termination head as depicted in FIG. 4. The high pressure pump is characterized by the capacity to deliver pressures across the range of from 100-20000 p.s.i. of pressure. The SV, AUV or ROV powers the pump to pump water out of the pipeline in accordance with the following parameters.

For purposes of pigging, several dynamic components are involved in the amount of pressure needed to drive a subsea pigging unit ("SSPU"): the hydrostatic pressure of the water over the pipe, the friction pressure of the fluid as it moves through the pipe, and the friction of the pig against the pipeline walls (pig differential). Compared with the hydrostatic pressure, which changes dramatically with water depth, the friction pressure and the pig differential are relatively insignificant. The pressure required to drive a dewatering pig through a flooded pipeline in 1000 meters of water, taking for example, a 30 psi pig differential (assuming movement of the pig at approximately 0.5 meters/sec) and a 30 psi friction loss can be calculated as 1497 p.s.i. (hydrostatic pressure)+30 p.s.i. (friction loss)+30 p.s.i. (pig differential) would be approximately 1560 p.s.i. If the pig is to be driven solely by the force of a gas as in typical dewatering applications, the volume of gas that is required is equal to line volume at a pressure that is 60 p.s.i. over the hydrostatic pressure. This requires a huge top-side compressor skid and an enormous volume of gas.

The present invention solves this problem and avoids the need for such top-side gas capacity. In accordance with the dewatering methods of the present invention, the pig is effectively pulled though the pipeline by using the SV, AUV or ROV to attach the pumping skid of the invention to the end of the pipeline that is distal to the location of the pig and pumping out from the pipeline such that the pig is pulled toward the pump, followed by a relatively modest volume of gas. Because the water is pumped from the pipeline, the hydrostatic head can be overcome by the pump so that the gas pressure behind the pig need be no higher than that required to overcome friction between the pig(s) and the pipe wall, friction between the column of water and the pipewall, plus the suction pressure. As a consequence of dewatering, the pipeline is thereby sufficiently un-weighted that it can be raised to the surface.

EXAMPLE 4

Pipeline Physical Integrity Testing

In one embodiment of the invention, testing to locate any potential damage is provided by an SPSS that is lowered to the pipeline by an SV, AUV or ROV. The SPSS includes at least a high-pressure pump having sufficient capacity to reduce the pressure in the pipeline to below the ambient hydrostatic pressure to check for in-flow leaks. In accordance with one embodiment, the high-pressure pump is defined as having a pumping capacity able to deliver 20,000 p.s.i. of pressure in a positive displacement mode, and a pressure monitoring capability able to detect a change in pressure of less than 1 p.s.i. High flow rates are not necessarily required, i.e. a low flow-rate of a minimum of approximately 3 gpm would suffice. The method used is to pump water out of the line thus lowering the pressure in the line, volumes pumped to achieve this will be small compared to total volumes in the line. Pressure is then monitored to detect increases in pressure (back toward ambient) indicating that seawater is leaking into the line. In one embodiment of the invention, the integrity of the pipeline is further analyzed by use of hydrophones conveyed along the pipeline by the SV, AUV or ROV.

EXAMPLE 5

Testing for Corrosion in Subsea Pipelines

Development of a deep-water offshore field anchored around a production-drilling-quarters (PDQ) platform is an immense undertaking, typically costing in excess of one billion dollars for the infrastructure. Such developments may be anchored in (very) deep water, at depths of 6,000 ft or more. These platforms will be used to gather production from multiple wells, producing both oil and gas. Reservoir pressures and temperatures for these deepwater developments are also at the extremes, and production can be at pressures over 17,000 p.s.i. and temperatures of 135° C. Extreme weather conditions offshore can frequently cause significant delays, or lead to relatively short construction seasons, and projects of this type can often extend over several years. Even under best conditions it can take months or years between the laying of subsea flowlines and first production. During this period the flowlines are filled with a chemical "line-pack" solution that may include corrosion inhibitors, oxygen scavengers and biocides, among others.

Chemical additives are available that are specifically tailored to various indications. In addition to the aforementioned corrosion inhibitors, oxygen scavengers, and biocides, typical chemical additives for treating pipelines include leak testing dyes, and hydrate, asphaltene, scale, and paraffin inhibitors.

In other circumstances in fields that have already been put into production, it is occasionally necessary to shut-down some or all of the flow-lines associated with a particular field or host platform. For example, damage to the host platform may necessitate shutting down the flow-lines until the platform is repaired. For shut-down, the flow-lines are filled with a chemical "line-pack" solution as previously described. In a further circumstance, production from certain smaller fields or wells within such fields may be shut-in to conserve reservoir pressure or because production is uneconomic at certain times. The flow-lines to these wells and field may be later reopened and connected to larger hub facilities via tie-backs. The availability of a hub facility may change the economics of production from the smaller fields. Meanwhile, the smaller field flow-lines are shut-in with chemically treated line-pack solutions. However, in order to safely reopen the production lines, it is desirable, if not necessary, to test the status of the chemical status of the line-pack solutions to ascertain whether the flow-line integrity has been compromised or whether corrosion, hydrate formation, etc. has occurred.

Heretofore, it has not been possible to test the status of the line-pack solution subsea. The present invention provides a solution to this need by providing methods and apparatus for subsea collection of actual samples of sufficient quantity to be able to determine whether the line-pack has provided suitable protection against corrosion or contamination. In one embodiment, a subsea chemical sampling bladder is provided and is transported to the pipeline section for collection of the samples. The sample shall be drawn from at least one end, and preferably from each end, of the flow-line. In one embodiment the bladder implement is transported to the pipeline section via an SPSS that includes a pump dimensioned to reduce the pressure in the pipeline sufficiently enough to collect sample(s). The SPSS shall be deployed and powered by an SV, AUV or ROV, depending on the water depth and availability. If any of the linepack fluids are not required to form part of the sample, these can be discharged through a filter, such as a carbon filter, to neutralize the chemicals prior to discharge into the environment. Each sample shall be recovered to the surface, refrigerated and returned to a testing facility for analysis.

Figure 3:
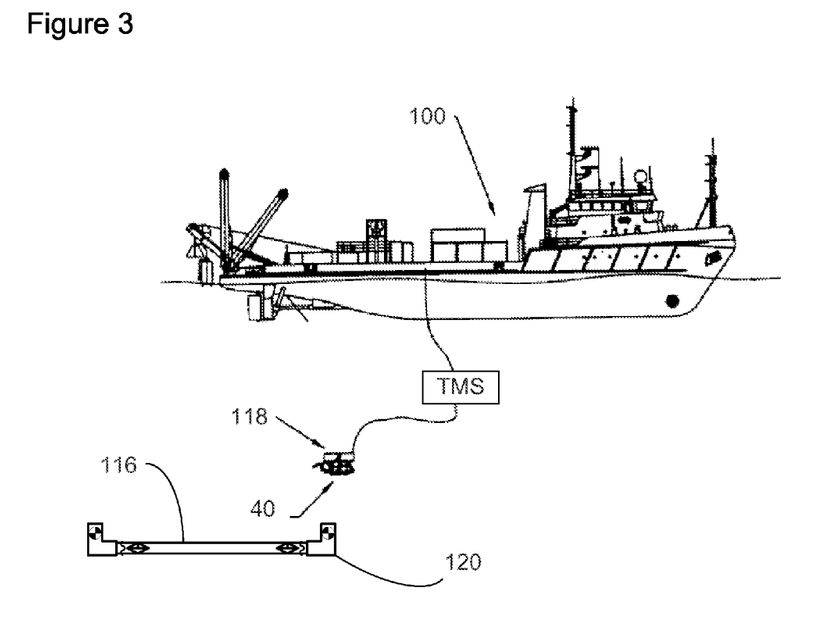

Specifically, as depicted in FIG. 3, an SPSS (40) will be deployed from a support ship (100) using an SV, AUV or ROV (118). In the case of the ROV depicted, connection to the ship is provided by a tether management system ("TMS"). The ROV transports the SPSS to a section of flowline (116) to be tested. In the embodiment depicted in FIG. 4, the flowline (116) is sealed on each end by PLETs (120), each of which will typically include a valved closure (122) and may further include a valved port (123) that is adapted as a hot stab-able connection (124).

An embodiment of a chemical sampling appliance (128) is depicted in FIGS. 5-8. The appliance includes sample collection bladder (32) secured within frame structure (34) that includes connecting means (50) for fixing the appliance to the SPSS and may optionally include lifting handles (52). In other embodiments, one or more bladders are strapped or affixed to the outside of the frame structure. Placement of the bladder on the outside of the frame provides considerable latitude in dimensioning the bladder. In certain embodiments, the outer bladder is protected by a cage structure. The bladder may be formed of any material able to provide a leak proof enclosure and able to withstand extremes of temperature and pressure. In one working embodiment of the invention, the bladder was formed of a proprietary elastomeric material (L4284UPW from Cooley Inc.) Other suitable materials are or may become available. In the embodiment depicted in the end view of FIG. 6, the piping (38) to the bladder includes a quick connect type connector (36) and on-off valve closures (54). As further depicted in FIGS. 7 and 8, at least one of the piping conduits may include a check-valve (56).

In order to take a sample, the suction side of the positive displacement pump shall be connected to the hot stab (124) on the PLET (120) or flowline plug (126) dependent upon the status of the flowline to be tested. The pump shall then be engaged and the system will reduce the absolute pipeline pressure inside the flowline. In general, the pressure reduction required will be controlled by the volume of the sample required, the line-pack pressure, and the hydrostatic pressure. Likewise, the required characteristics of the pump will be determined by these factors. In one embodiment of the invention a SPSS suitable for any condition including extremes of pressure is provided by inclusion of a high pressure positive displacement pump. For example, in one embodiment the pressure reduction required in order to extract this volume is a reduction below ambient of approximately 200 p.s.i. With the high pressure pump, a pressure pulled will not be less than a minimum pump suction pressure of 30 p.s.i. to avoid cavitation of the pump. For line lengths of 10,000 to 15,000 ft, and diameters of 8"-12", a reduction in pressure of 200 p.s.i. will extract over ten gallons of liquid. This shall be achieved by pumping line-pack water (30) out of the flowline and through a sample bladder of the chemical sampling appliance (128) where a representative portion of it shall be collected and ultimately returned to the surface/beach for analysis.

In one embodiment a representative sample is collected "mid-stream" or after a volume of line-pack has flushed through the bladder. Another criterion that contributes to a representative sample is to collect a sufficient volume of sample from at least one and preferably both ends of the flow line. For example, in the embodiment depicted in FIG. 5, the bladder has an approximate collection volume of one gallon, although larger or smaller volumes may be in other cases desirable.

Figure 17:
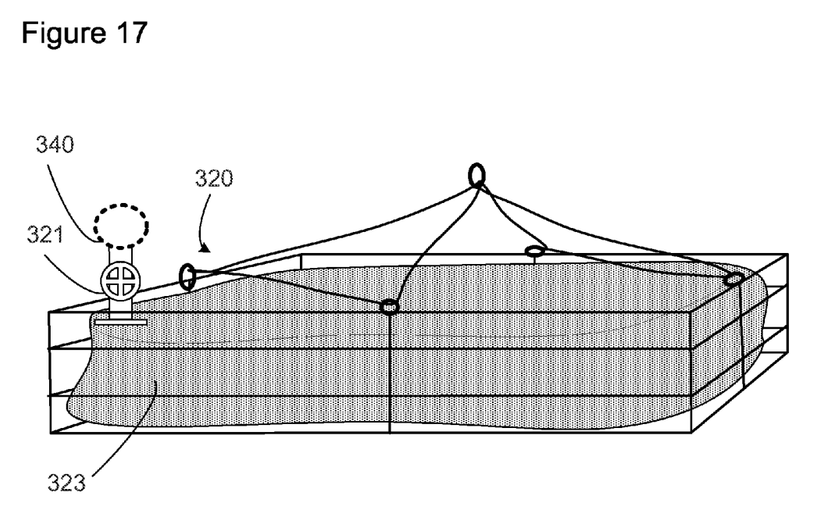
FIG. 17 depicts an embodiment of an affixed product removal bladder including a hydraulic compensator.
Figure 18:
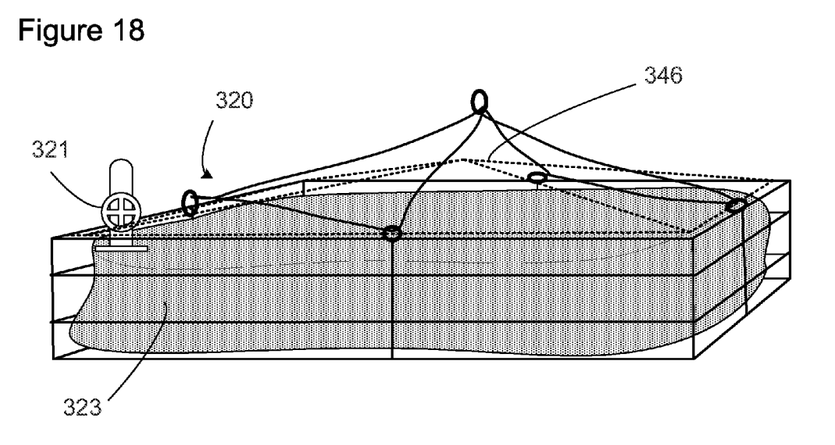
FIG. 18 depicts an embodiment of an affixed product removal bladder including a drag reducing shroud.

In one embodiment, a carbon or other chemical absorbent filter is disposed in fluid connection with an effluent outlet from the sample collection bladder to neutralize or collect chemicals present in the line-pack prior to discharging that part of the line-pack that is pumped out and not retained as part of the sample. In one embodiment, a data logger system is used to monitor pressure, temperature and volume pumped. Volume may either be directly measured using a flowmeter, or calculated using a stroke counter, to provide an indication of when the required volume of the line-pack fluid has been pumped. When the operation is complete, the SPSS shall disconnect from the flowline, and be moved back to the surface by the ROV (SV, AUV). As depicted in FIG. 18, the chemical testing bladder may be fitted with a shroud (346) to reduce effects of drag during return to the surface. Alternatively or additionally, as depicted in FIG. 17, the sample bladder may be fitted with a hydraulic compensator (340) in order to control discharge of fluid during return to the surface. The sample will be removed for analysis, and the procedure repeated for any further samples required.

In one embodiment of the invention, following collection of the sample(s), the SPSS is reconfigured and used to pump chemically treated seawater back into each flowline to bring the internal flowline pressure back up to absolute hydrostatic head. The fresh chemical is preferably provided by chemical treatment bladders (6) mounted in or on the SPSS depicted in FIG. 9. If PLETs are still attached to the flowline and as depicted in FIG. 4, the flow line can be severed at a cut location (125) between each PLET (122) and each terminal plug (126). The PLETs can then be recovered to the surface if desired for testing and refurbishing.

EXAMPLE 6

Subsea Product Removal

In some cases, service is required on a portion of a subsea product or flow line system that has been in service and contains hydrocarbon products. In one embodiment of the invention, methods and apparatus are provided for subsea removal of such product from a subsea structure such that the structure can be serviced. Subsea structures as used herein include flowline jumpers, flowline termini or manifolds, Christmas trees or any other subsea structure used to convey fluids subsea.

For example, in one embodiment of the invention product is removed from a subsea flowline jumper. A typical example of a flowline jumper is a connection between the production outlet of a Christmas tree to a pipeline end termination (PLET) or pipeline end manifold (PLEM) or between two subsea pipelines. Typically a flowline jumper (300) will include at least two fluid couplings (305) connected by a conduit (307). The fluid couplings of the jumper are adapted for connection to mating sockets on other subsea structures. The flowline jumper is typically a rigid structure but may alternatively include a flexible conduit. In either event the fluid couplings of the flowline jumper are oriented to connect with termini of pipeline or production outlets, which will typically include isolation valves such that hydrocarbon product in the pipeline and the production source can be sealed off from the jumper. Under such conditions, hydrocarbon may remain in the jumper or other structure that is dead legged from the flowline and production source.

Figure 16:
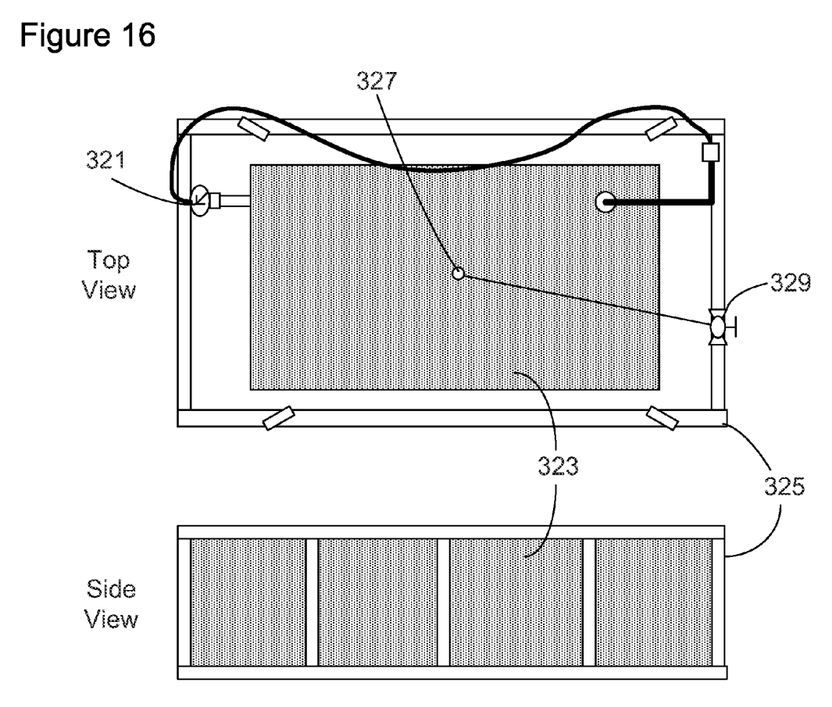
FIG. 16 depicts an embodiment of a containment skid including a product removal bladder.

In accordance with the present embodiment, methods and apparatus are provided for subsea removal of hydrocarbon product from subsea structures such that the structures can be serviced or replaced. In one method of product removal depicted in FIG. 13, the SPSS (40) is deployed to a subsea structure such as flowline jumper (300). The depicted jumper is not drawn to represent a relative scale to the SPSS. Indeed the subsea structure may in many instances be many times the size of the SPSS. The SPSS can be lowered to the sea floor by a cable from the surface vessel, or can be carried by an SV, AUV or ROV (118), depending on the water depth and availability. Once on the seafloor, the SV, AUV or ROV can be utilized to make connections and to power the SPSS pumps. In the embodiment depicted in FIG. 13, a containment skid (320) is provided that includes a product removal bladder (323) disposed in a cage structure (325). Depending on its dimensions, the containment skid (320) may be lowered to the seafloor by cable or, alternatively, be maneuvered by the SV, AUV or ROV. By the use of containment skids, considerable latitude is enabled in dimensioning the bladder. For one non-limiting example, FIG. 16 depicts a top and side view of an exemplary containment skid having a cage dimension of 24 ft.×8 ft.×3 ft. and including a 2000 gallon bladder. In the embodiment depicted in FIG. 16, the bladder (323) includes a valve closure (321) as well as a vent (327) connected to a bleed valve (329).

Product removal can be effected directly using the SPSS pump if the jumper includes outlets that are sufficiently large that direct connection to the SPSS pumps is feasible. However, where a drain outlet on the jumper is too small for utilization of the main SPSS pumps, product can be removed from the jumper by relying on the lower specific gravity of hydrocarbons relative to seawater to allow the product to float on the water column and thus be displaced with the seawater that is introduced into the structure from a low point of the structure. The product can then be collected in the bladder and recovered for onshore disposal.

Figure 13:
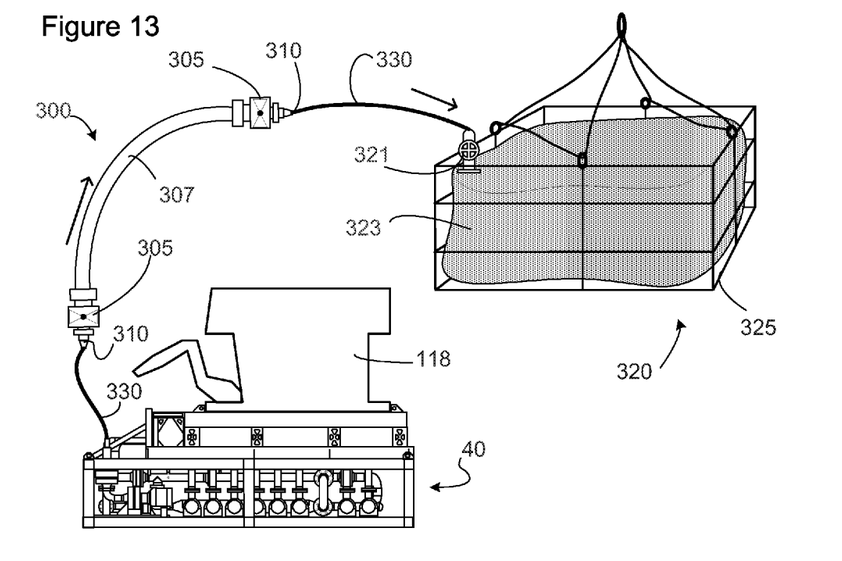
FIG. 13 depicts an SPSS recovering product from a subsea structure by pumping seawater into the structure and thus pushing the product into a product removal bladder.

In one embodiment as depicted in FIG. 13, the SV, AUV or ROV is utilized to connect the product removal bladder to a high point of fluid containment within the subsea structure. A valve inlet or fluid coupling (310) on a low point of the subsea structure (300) is connected to the output flow line (330) of the SPSS (40) and a pump on the SPSS is engaged to pump filtered seawater into the low point in order to push the remaining product disposed in the subsea structure into the product removal bladder (320).

Figure 14:
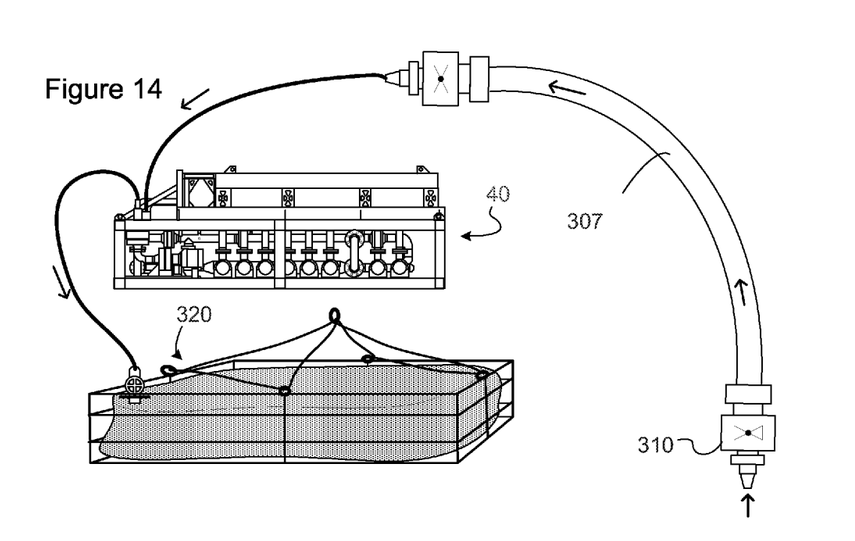
FIG. 14 depicts an SPSS recovering product from a subsea structure by pulling product out of the structure and into a product removal bladder.

Alternatively, as depicted in FIG. 14, the hydrocarbon can be pulled from the subsea structure and into the product removal bladder by connection to an inlet of an SPSS pump. In some embodiments, a jumper is in fluid connection to a PLET or PLEM or other subsea structure and an outlet on the far end of the structure is opened such that product can be drained from the structure though the jumper and ultimately into the product removal bladder.

In some cases, the jumper connection is characterized by a fluid volume that can be removed into a subsea bladder that can be manipulated and brought to the surface by an SV, ROV or SUV in a single trip. In other cases however, the jumper may include a volume exceeding that which can be carried in one trip. In one embodiment of a solution provided by the present disclosure, product is removed from the large volume jumper by deploying a plurality of product removal bladders to the sea floor, which are filled sequentially for recovery to the surface after filing.

Figure 15:
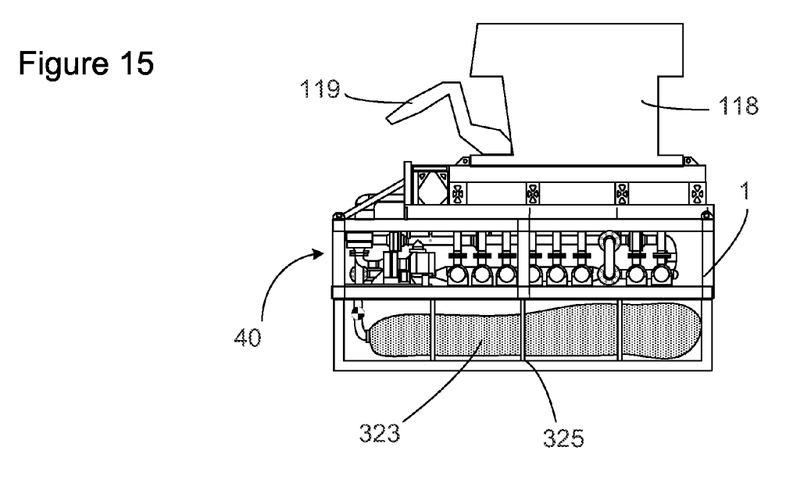
FIG. 15 depicts an embodiment of an SPSS including an affixed product removal bladder.

In other embodiments where smaller volumes are to be removed at least one product removal bladder is strapped or affixed to the outside of the frame structure (1) of the SPSS (40) as depicted in FIG. 15. Placement of the bladder on the outside of the SPSS frame provides considerable latitude in dimensioning the bladder. FIG. 15 depicts the product removal bladder affixed under the pumping skid of the SPSS. In other embodiments, the product removal bladder is affixed to one or more sides or the top of the pumping skid. Further separate bladders can be deployed if necessary. The SPSS together with affixed or separate bladders can deposited on the sea floor and the SV, AUV or ROV can then disconnect from the SPSS for manipulation of valves, umbilicals, etc.

All publications, patents and patent applications cited herein are hereby incorporated by reference as if set forth in their entirety herein. While this invention has been described with reference to illustrative embodiments, this description is not intended to be construed in a limiting sense. Various modifications and combinations of illustrative embodiments, as well as other embodiments of the invention, will be apparent to persons skilled in the art upon reference to the description. It is therefore intended that the appended claims encompass such modifications and enhancements.

The invention claimed is:

1. A method of subsea pipeline integrity testing comprising the steps of:
   providing a subsea pipeline service skid (SPSS) that comprises at least one high pressure pump that is capable of continuing to deliver flow where ambient pressures at both suction and discharge are equal to or greater than 400 pounds per square inch (p.s.i.) and a pressure monitor able to detect a change in pressure of about 1 (p.s.i.) within a pipeline;
   utilizing a Submersible Vehicle (SV), an Autonomous Underwater Vehicle (AUV) or a Remote Operated Vehicle (ROV) to move the SPSS to a subsea section of the pipeline, wherein a pipeline termination head is affixed to each end of the pipeline;
   using the SV, AUV or ROV to power the at least one high pressure pump to pull fluid out of the pipeline and thereby reduce pressure in the pipeline below ambient pressure around the pipeline; and
   monitoring pressure in the pipeline to determine if any in-flow leakage occurs sufficient to change pressure within the pipeline.

2. The method of claim 1, wherein the at least one high pressure pump is dimensioned to reduce pressure within the pipeline at a hydrostatic pressure of 4000 p.s.i.

3. The method of claim 1, wherein the at least one high pressure pump has a range of pressure pumping capacity of from 100 to 20,000 p.s.i.

4. The method of claim 1, further comprising providing at least one fluid collection bladder in fluid communication with the at least one high pressure pump and collecting at least a portion of the fluid within the pipeline by pumping the portion into the at least one fluid collection bladder.

5. The method of claim 4, further comprising filtering and treating any fluid that is not collected in the at least one fluid collection bladder prior to discharging that part of a fluid that is pumped out and not retained as part of the portion retained in the at least one fluid collection bladder.

6. The method of claim 4, further comprising returning the at least one fluid collection bladder to a surface vessel for testing or disposal.

7. The method of claim 4, wherein the at least one fluid collection bladder is elastomeric and disposed within a cage.

8. The method of claim 1, further comprising utilizing SV, AUV or ROV to convey hydrophones along the pipeline to locate in-flow leakage.

9. The method of claim 1 further comprising redosing the pipeline with a chemical solution after completion of the integrity testing.

* * * * *